No. 896,913. PATENTED AUG. 25, 1908.
W. W. HOPKINS.
TYPE WRITING MACHINE.
APPLICATION FILED DEC. 19, 1907.

Witnesses:
Geo. P. Ladson
Wells L. Church

Inventor:
William W. Hopkins.
By Bakewell & Cornwall Attys.

Fig. 3.

No. 896,913. PATENTED AUG. 25, 1908.
W. W. HOPKINS.
TYPE WRITING MACHINE.
APPLICATION FILED DEC. 19, 1907.

Witnesses:
Geo. R. Ladson
Niels L. Church

Inventor:
William W. Hopkins.
By Bakewell Cornwall Attys.

No. 896,913. PATENTED AUG. 25, 1908.
W. W. HOPKINS.
TYPE WRITING MACHINE.
APPLICATION FILED DEC. 19, 1907.

Witnesses:
Geo. R. Ladson
Nels L. Church

Inventor:
William W. Hopkins.
By Bakewell Cornwall Attys.

No. 896,913. PATENTED AUG. 25, 1908.
W. W. HOPKINS.
TYPE WRITING MACHINE.
APPLICATION FILED DEC. 19, 1907.

Witnesses:
Geo. R. Ledson.
Niels L. Church.

Inventor:
William W. Hopkins.
By Bakewell Cornwall Atty's

UNITED STATES PATENT OFFICE.

WILLIAM W. HOPKINS, OF ST. LOUIS, MISSOURI, ASSIGNOR TO MOON-HOPKINS BILLING MACHINE COMPANY, OF ST. LOUIS, MISSOURI, A CORPORATION OF MISSOURI.

TYPE-WRITING MACHINE.

No. 896,913.      Specification of Letters Patent.      Patented Aug. 25, 1908.

Application filed December 19, 1907. Serial No. 407,191.

*To all whom it may concern:*

Be it known that I, WILLIAM W. HOPKINS, a citizen of the United States, residing at St Louis, Missouri, have invented a certain new and useful Improvement in Type-Writing Machines, of which the following is a full, clear, and exact description, such as will enable others skilled in the art to which it appertains to make and use the same, reference being had to the accompanying drawings, forming part of this specification, in which—

This invention relates to typewriting machines, and particularly to that class of machines in which a member that carries type comprising numerals and the letters of the alphabet is moved vertically and transversely to position individual type in alinement with an actuating hammer which causes an impression of the type to be made on the sheet of paper on the platen of the machine.

One object of my present invention is to provide a machine of the type referred to which is so designed that the type-carrying member will arrive in printing position before the type-actuating hammer is operated.

Another object of my invention is to provide a type-writing machine in which the type-actuating hammer is operated by the key levers, the machine being so designed that the first half of the downward movement of the key levers is utilized to actuate the mechanism that positions the type-carrier and the last half of the downward movement of the key levers is utilized to operate the type-actuating hammer. And still another object of my invention is to provide a type-carrying member of novel construction.

Other desirable features of my invention will be hereinafter pointed out.

Figure 5:
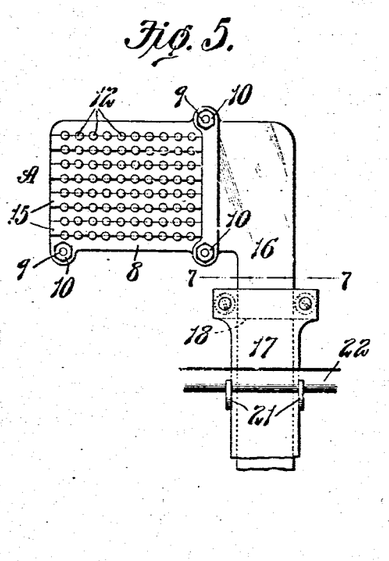
Fig. 5 is a front elevation of the type-carrying member.
Figure 6:
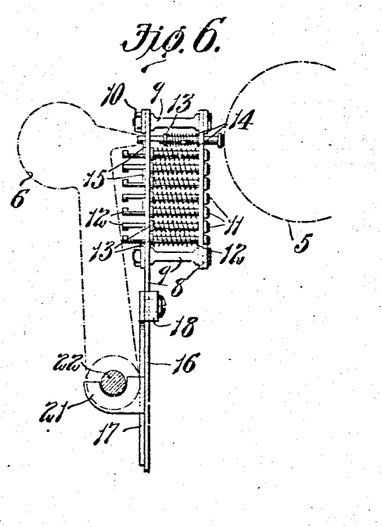
Fig. 6 is an end elevation of the parts shown in Fig. 5.
Figure 7:
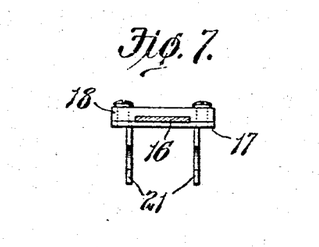
Fig. 7 is a cross sectional view taken on the line 7—7 of Fig. 5.

Referring to the drawings which illustrate the preferred form of my invention, 1 designates the frame of the machine, and 2 the key levers which are pivotally connected at their rear ends to a horizontally disposed rod or shaft 3. The carriage 4 of the machine has a platen 5 around which the paper is wrapped, and an escapement mechanism and spring drum are provided for moving the carriage transversely of the frame from right to left with a step-by-step movement. The type are carried by a member A which is moved vertically and horizontally to bring individual type into a certain position relatively to the platen and said type are forced toward the platen to make an impression on the paper by means of an actuating hammer 6, the machine also being provided with an inking ribbon 7 that is arranged between the type and the platen. The member A which carries the type consists of two plates 8 spaced apart by means of three fillers 9, as shown in Fig. 6, and connected together by means of nuts 10 mounted on reduced portions of said fillers, as shown in Fig. 5, the type 11 being connected to the rear ends of horizontally disposed plungers 12 which are reciprocatingly mounted in the plates 8. Each plunger is provided with a collar 13, and a coiled spring 14 surrounds the plunger between the collar 13 and the rear plate 8 to return the plunger to normal position after it has been moved by the hammer 6. The plungers are arranged in rows and are prevented from rotating by means of strips or bars 15 connected to the front face of the front plate 8 and engaging flattened portions on the plungers, each bar 15 contacting with flat portions on two horizontal rows of plungers, as shown in Fig. 6.

Figure 1:
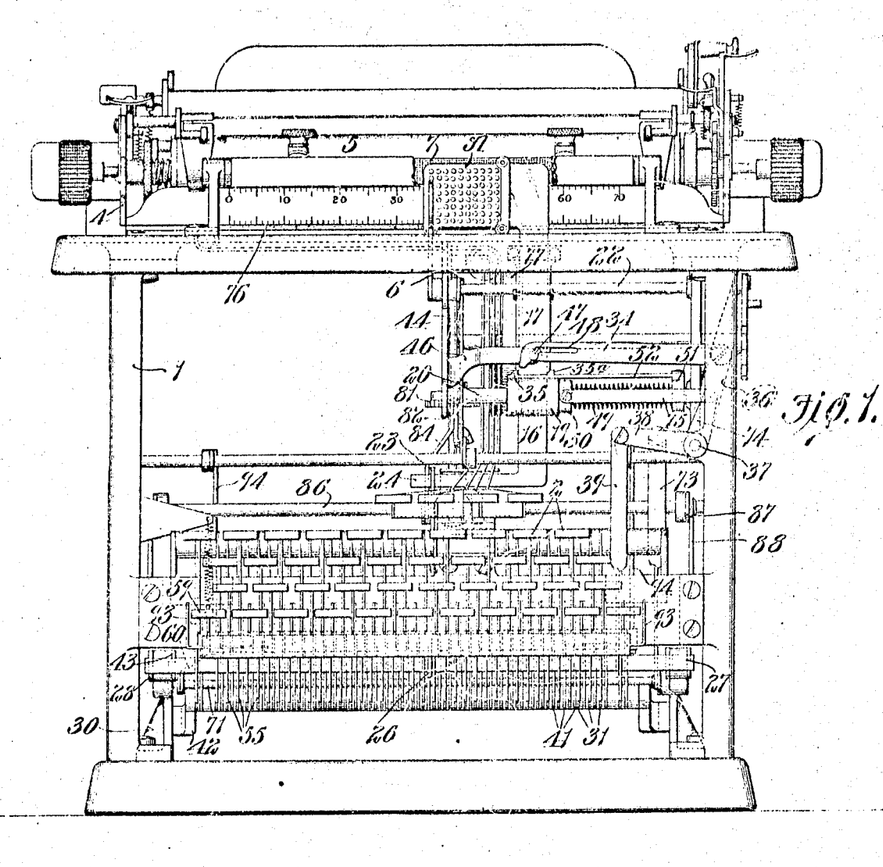
Figure 1 is a front elevation of a typewriting machine constructed in accordance with my invention.
Figure 2:
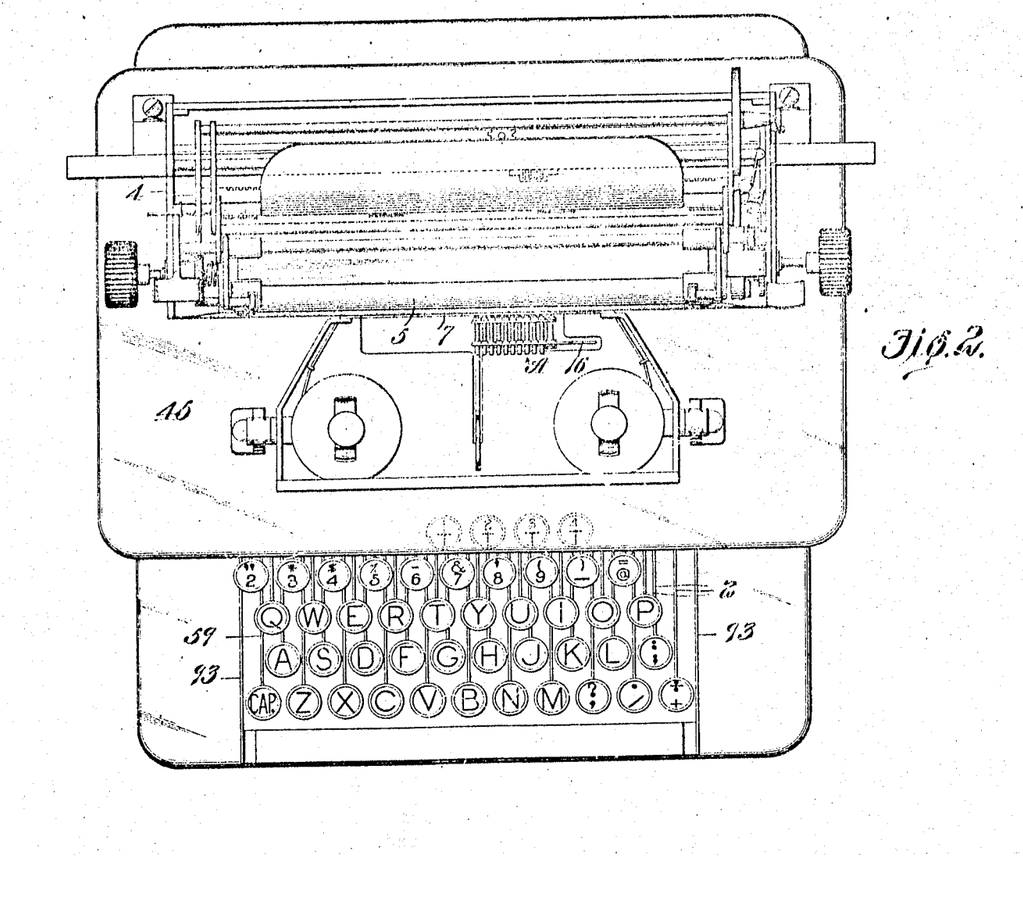
Fig. 2 is a top plan view of said machine.

The machine is preferably provided with eighty type comprising the small and capital letters of the alphabet and also several numerals and signs or symbols, each of the plungers being provided at its rear end with an individual type 11. The type which designate the small letters of the alphabet and some of the numerals and symbols are carried by the five vertical rows of plungers 12 mounted in the left-hand half of the member, as seen in Fig. 1, and the capital letters of the alphabet and the rest of the numerals and signs are carried by the five vertical rows of plungers 12 mounted in the right-hand half of the member A, each vertical row comprising eight plungers. The type-carrying member A is connected to the upper end of a vertically reciprocating bar 16 which is mounted in a horizontally movable guide 17, means being provided for moving the bar 16 vertically and the guide 17 laterally or horizontally to bring the different plungers in the member A into alinement with the actuating hammer 6. The guide 17 consists of a plate having notched keepers or strips 18 through which the bar 16 passes and said guide is connected at its lower end to a sleeve 19 which is slidingly mounted on a horizontally disposed shaft 20, said guide plate 17 being provided adjacent its upper end with arms 21 that partially surround a horizontal shaft 22, as shown in Figs. 4 and 5, so as to retain the guide in an upright position.

I will now describe the means for imparting vertical movement to the type-carrying member A. Said means comprises a link 23 provided at its upper end with an elongated slot for receiving a laterally projecting extension or arm 24 at the lower end of the bar 16 and having its lower end connected to the rear end of a lever 25, the front end of said lever 25 being connected to a link 26 which is fastened to a bar 27 that passes horizontally under all of the key levers 2. The horizontal bar 27 is secured to the forward ends of arms 28 fulcrumed at their rear ends on a cross shaft 29 which is mounted in bearings 30, and the key levers 2 are provided with laterally projecting pins $2^a$ that actuate pivotally mounted arms 31 which engage the bar 27 and move it downwardly for varying distances so as to cause the type-carrying member A to be moved vertically for various distances. The type-carrying member is moved downwardly, back to normal position by means of an expansion spring 33 interposed between a stationary part of the frame of the machine and the edge of the lever 25, as shown in Fig. 4. The means for moving the type-carrying member A horizontally, to the left of Fig. 1, comprises a bar 34 provided at its inner end with a tooth which engages a lug 35 on the upper side of the sleeve 19 connected to the guide in which the bar 16 is mounted, said actuating bar 34 being connected at its outer end to an arm 36 on a rock shaft 37 provided at its front end with an arm 38 to which a link 39 is secured. The link 39 is connected at its lower end to a horizontal bar 40 which extends parallel to the bar 27 that passes underneath the key levers 2, and the laterally projecting pins $2^a$ on said key levers operate another set of pivotally mounted arms 41 that coöperate with the bar 40 so as to move it downwardly and thus actuate the bar 34 for moving the type-carrying member to the left. The horizontal bar 40 is carried by pivotally mounted arms 43 arranged inside of the arms which carry the horizontal bar 27. A plate 44 which is secured to the underneath side of the top plate 45 of the frame of the machine forms a support for one end of the shaft 20 on which the sleeve 19 is mounted and this plate is provided with a bracket 46 carrying a pin 47 that projects through an elongated slot 48 in the actuating bar 34 for the purpose of guiding said bar. As shown in Fig. 1, the inner end of the slot 48 is curved so that when the bar 34 is forced to the left it will also move downwardly and thus cause the tooth thereon to engage the lug 35 on the sleeve 19, the bar 34 normally lying in such a position that its tooth will be in a higher horizontal plane than the lug 35. Said sleeve 19 is moved to the right of Fig. 1 to return the type-carrying member A to normal position by means of a coiled spring 49 interposed between a collar 50 on the shaft 20 and a collar 51 which is connected to the sleeve 19 by a bar 52, as shown clearly in Fig. 1.

Figure 4:
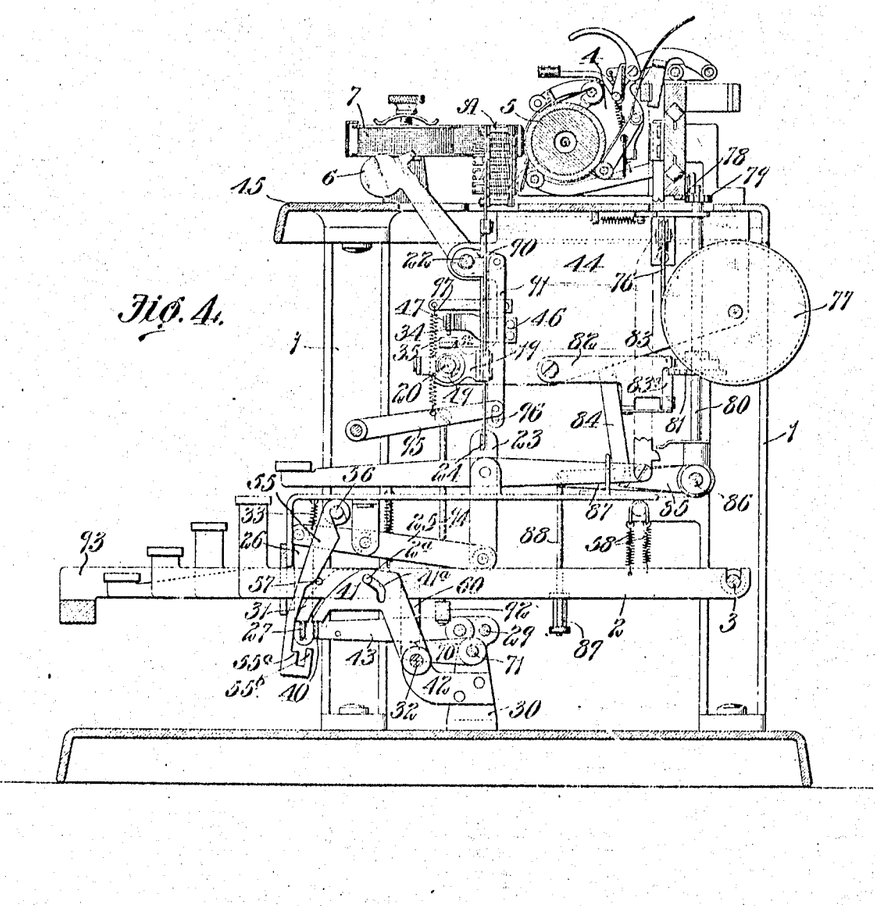
Fig. 4 is a vertical sectional view of the machine.
Figure 8:
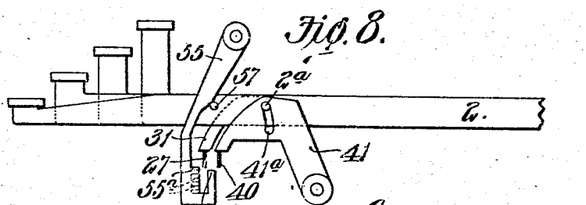
Figs. 8 to 12, inclusive, are detail views illustrating the arms that are used for moving the type-carrying member laterally.
Figure 9:
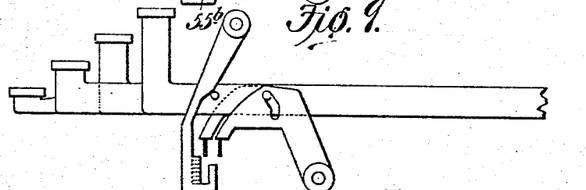
Figure 10:
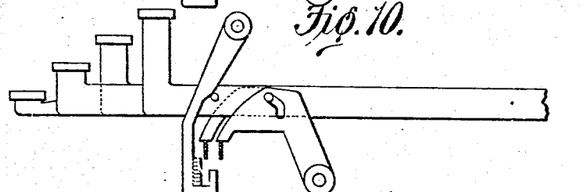
Figure 11:
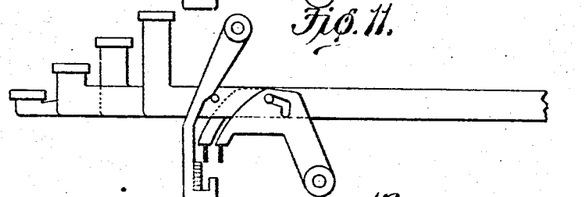
Figure 12:
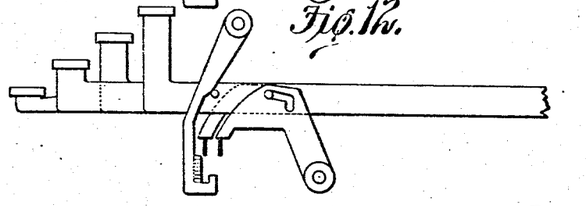
Figure 13:
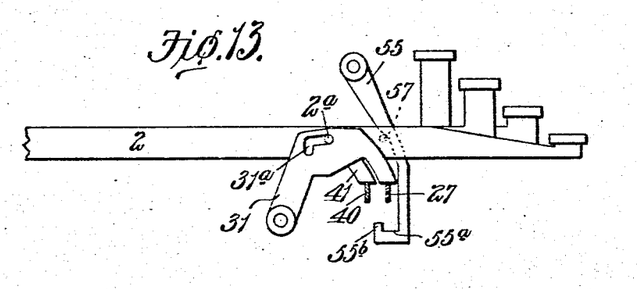
Figs. 13 to 20, inclusive, are detail views illustrating the arms that are used for moving the type-carrying member vertically.
Figure 14:
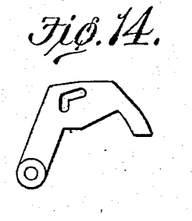
Figure 15:
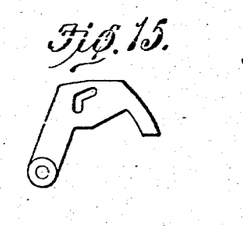
Figure 16:
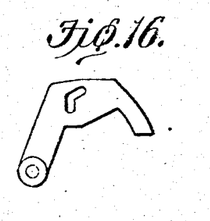
Figure 17:
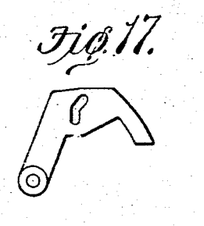
Figure 18:
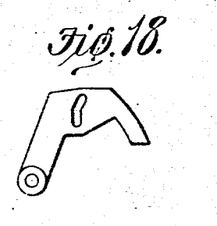
Figure 19:
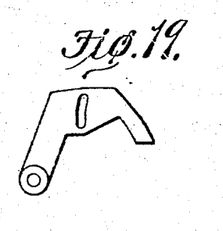

The pivotally mounted arms or members 31 which govern the vertical movements of the type-carrying member A and the arms 41 which govern the lateral movements of said type-carrying member, are pivotally mounted on a shaft 32 supported by bearings 42, as shown in Fig. 4, each of the key levers 2 being arranged between an arm 31 and an arm 41, so that the lateral projecting pin $2^a$ on each of the key levers will enter slots in a pair of arms 31 and 41. The slots in the arms 31 and 41 into which the pins $2^a$ project, are of different shapes so that said arms will be moved different distances. For example, the arms 41 that coöperate with the key levers that control the first vertical row of type; namely, the type on the vertical row of plungers 12 at the left-hand end of the type-carrying member A, as seen in Fig. 1, are provided with slots $41^a$ which are so formed that no movement will be imparted to said arms when the key levers of this set are depressed for it is not necessary to move the type-carrying member A laterally to bring the type on this row of plungers into alinement with the actuating hammer 6. All of the arms 41 that coöperate with this set of key levers, have slots $41^a$ of the same shape, one of said arms being shown in Fig. 8. The arms 31 that coöperate with the key levers of this set, however, each have a different shaped slot $31^a$ so that the bar 27 will be depressed a different distance when each key lever of this set is operated and thus cause the type-carrying member A to move upwardly for different distances, the eight arms 31 which coöperate with the key levers of this set, being shown in Figs. 13 to 20, inclusive.

Figure 20:
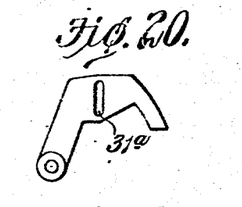

The arms 31 that coöperate with the key levers that control the type in the first horizontal row of type; namely, the type on the horizontal row of plungers at the upper edge of the type-carrying member A, are also provided with slots which are so formed that no movement will be imparted to said arms when the key levers are depressed, for it is not necessary to move the type-carrying member vertically to bring the type of the first horizontal row into alinement with the actuating hammer, one of the arms 31 that coöperates with this set of key levers being shown in Fig. 20.

The arms 41 that coöperate with the key levers that control the type on the second row of vertical plungers are provided with slots of the same shape but said slots are so formed that movement will be imparted to said arms so as to move the bar 40 downwardly and thus impart lateral movement to the type-carrying member whenever one of the levers of this set is depressed, the arms 41 that coöperate with the key levers which control the type on the third row of vertical plungers being provided with slots which are so designed that greater movement will be imparted to the bar 40 so as to move the type-carrying member a further distance to the left. The key levers which control, respectively, the type on the third, fourth and fifth vertical rows of plungers coöperate with arms 41 that have different shaped slots so that the type-carrying member will be moved horizontally or to the left for different distances to properly position the plungers on these different rows in alinement with the actuating member. The slots in the sets of arms 31 and 41 are so formed that movement will be imparted to said arms on the first half of the downward movement of the key levers, each of said slots having an extension, as shown in Figs. 8 to 20, in which the pins 2ª on the key levers move without actuating said arms. The downward movement of the key levers is utilized to actuate the hammers 6, as hereinafter more fully described, and one advantage in forming the slots in the arms 31 and 41 so that said arms will be actuated on the first part or half of the downward movement of the key levers, is that said key levers are relieved from a double load because the hammer-actuating mechanism is not operated until after the arms 31 and 41 have been depressed to position the type-carrying member.

Another advantage of such construction is that the type-carrying member is moved into position before the hammer engages the plungers which carry the type so that said type-carrying member will have time to recoil or spring back into position in case the momentum which it gains in moving into position should carry it past the point at which it is designed to come to rest. Consequently, there is no possibility of the printing being blurred as would be apt to occur if the printing hammer should engage the type plunger before the type-carrying member had an opportunity to recoil or spring back into printing position. The same key levers which control the type on the plungers in the five vertical rows in the left-hand half of the type-carrying member A also control the type on the five vertical rows of plungers in the right-hand half of said type-carrying member, said member being shifted laterally to the left of Fig. 1 by mechanism hereinafter described so that the plungers in the right-hand half of the type-carrying member will occupy the positions formerly occupied by the plungers in the left-hand half of the type-carrying member.

Figure 3:
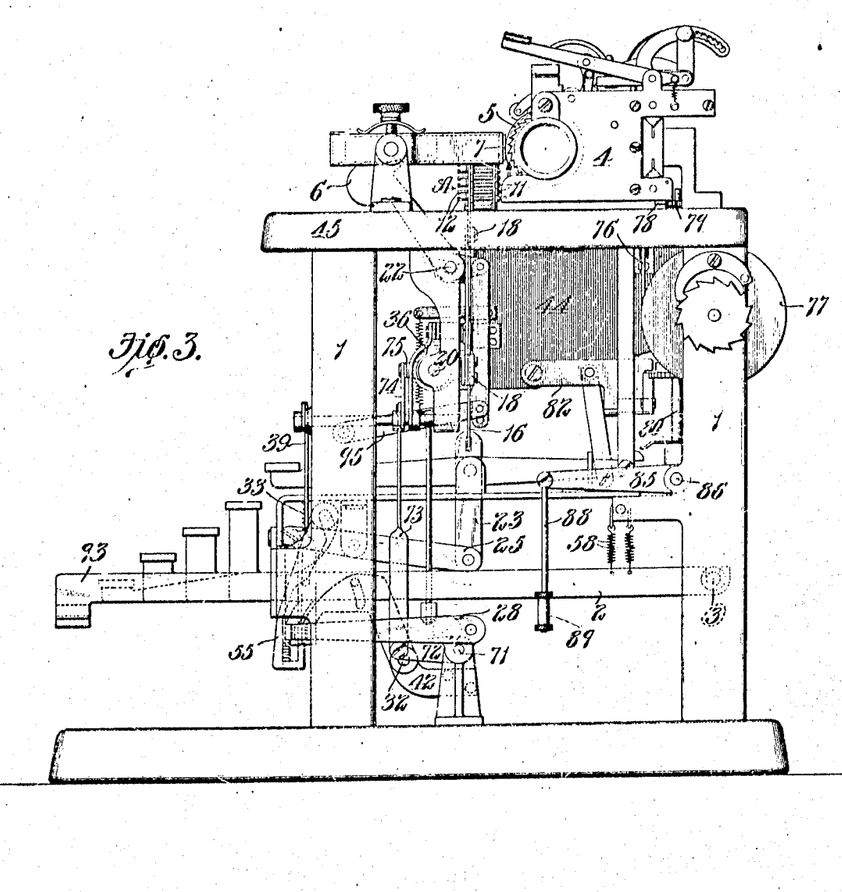
Fig. 3 is an end elevation of said machine.

Coöperating with the arms 31 and 41 that are depressed by the key levers are stops which control the downward movement of the key levers and also lock the horizontal bars 27 and 40 to securely hold the type-carrying member in the position to which it has been moved. A stop 55 is provided for each key lever, said stops being pivotally mounted at their upper ends on a cross shaft or rod 56, as shown in Figs. 3 and 4. Preferably, the stops 55 are provided at their upper ends with open slots so that they can be slipped over or hung on the shaft 56, said shaft being provided with spaced grooves or slots that extend transversely of the shaft to receive the stops and thus hold them at the proper distance from each other. The connection between the key levers 2 and the shaft 3 on which they are fulcrumed is also formed in the same manner, as shown in Fig. 4. This forms a very simple and efficient means for holding the key levers and stops in proper position and overcomes the necessity of using spacing collars on the shafts or fulcrums. The stops 55 are provided at their lower ends with lugs 55ª and 55ᵇ of different lengths that vary in length according to the shape of the slots in the arms 31 and 41 with which the key levers coöperate so that when the key levers are depressed, the stops will swing inwardly by force of gravity and thus bring the lugs thereon into position to arrest the downward movement of the horizontal bars 27 and 40, the stop lugs being so proportioned that all of the key levers will be depressed the same distance but the horizontal bars 27 and 40 will be depressed for varying distances according to the shape of the slots in the arms 31 and 41. The stop lugs 55ª and 55ᵇ also coöperate with the arms 31 and 41 to securely clamp the horizontal bars 27 and 41 which impart vertical and lateral movement to the type-carrying member A so that said member will be locked in its adjusted position. The stops 55 are arranged between the key levers, and each of said levers is provided with a laterally projecting pin 57 that engages the inner edge of its coöperating stop, as shown in Fig. 4, and moves the lower end of same outwardly when the key lever is returned to normal position by means of its return spring 58.

The means for shifting the type-carrying member A laterally to the left to bring the plungers which are provided with capital letter type into operative position, consists of a cap key lever 59 connected by a link 60 to an arm 70 on the left-hand end of a horizontal shaft 71 journaled in the bearings 30, said shaft being provided at its right-hand end, as shown in Fig. 3, with an arm 72 to which a link 73 is secured. The upper end of the link 73 is connected to a bell crank lever 74, and said bell crank lever is connected by a link 75 to the collar 50 which is loosely mounted on the shaft 20 and butts against the sleeve 19 on the guide in which the supporting bar 16 of the type-carrying member is mounted, as shown in Fig. 1. Whenever the cap key lever is depressed the link 73 will be pulled downwardly and the sleeve 19 and guide connected thereto will be moved to the left looking at Fig. 1. The sleeve 19 is provided with an additional lug 35ª and when the type-carrying member is in its shifted position this lug 35ª will occupy the same position relatively to the actuating bar 34 that the lug 35 occupied when the type-carrying member was in its normal position so that the same degree of lateral or horizontal movement will be imparted to the type-carrying member whenever the bar 34 is actuated. As the collar 51, which forms an abutment for one end of the returning spring 49, is fastened to the sleeve 19 by means of the bar 52, said spring will be shifted laterally when the sleeve 19 is shifted so that said spring will be under the same tension when the type-carrying member is in its normal position and its shifted position.

The carriage 4 on which the platen is mounted, is moved transversely from right to left by means of a cable 76 connected to the carriage and to a spring drum 77 and a step-by-step movement is imparted to said carriage by an escapement mechanism which will now be described.

The carriage is provided with a rack 78 with which coöperates a pinion 79 on the upper end of a rotatable shaft 80 that is mounted in pivoted bearings, and said shaft is provided with a ratchet wheel 81 with which an escapement pawl 82 coöperates. This escapement pawl is pivotally mounted on the plate 44 and is provided with a rigid tooth 83 and a yielding tooth 83ª. Movement is imparted to said pawl by means of a link 84 connected at its lower end to a rock arm 85 secured to a shaft 86 which is rocked by the depression of the key levers, said rock shaft 86 being provided with arms 87 that are secured by means of rods 88 to a bar 89 which passes underneath all of the key levers. Whenever one of the key levers is actuated the yielding tooth 83ª on the escapement pawl will permit the ratchet wheel 81 to rotate one tooth and thus permit the carriage 4 to move one step to the left.

The hammer 6, which actuates the plungers 12 on which the type are mounted, is rigidly connected to the shaft 22, and said shaft is provided with an arm 90 to which a link 91 is connected, as shown in Fig. 4. A bar 92 that extends underneath all of the key levers, with the exception of the cap key lever 59 and the shift key levers 93, is connected by means of a link 94 to a rock arm 95 provided at its rear end with a pin which enters an elongated slot 96 in the lower end of the link 91 so that whenever one of the key levers is depressed the arm 95 will be rocked and thus pull the link 94 downwardly to actuate the hammer 6. When the key levers are released the parts just described will be returned to normal position by means of a coiled spring 97 that is connected to the rock arm 95 and to a stationary part of the frame of the machine. By providing the link 94 with an elongated slot 96, as shown in Fig. 4, the arm 95 can rock downwardly a certain distance without imparting movement to said link, the parts being so designed that the pin on the rock arm 95 does not come into contact with the lower end of the slot 96 until after the arms 31 and 41 have been depressed to position the type-carrying member A. Consequently, the key levers will not be subjected to a double load at the same time. That is to say, the only work which the key levers have to do on the first half of their downward movement is to actuate the positioning arms 31 and 41, and the only work which they have to do on the last half of their downward movement is to actuate the hammer 6. Furthermore, as the hammer 6 is operated directly from the key levers I am able to positively control the movements of the hammer, this construction also being very desirable on account of its simplicity.

Figure 21:
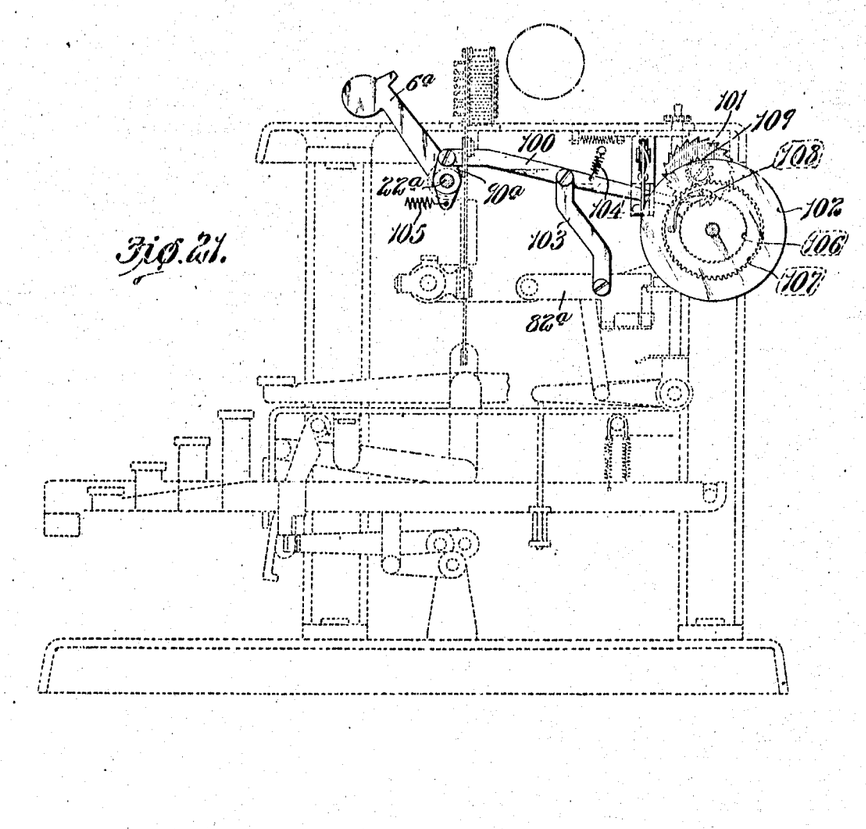
Fig. 21 illustrates a modified form of hammer-actuating mechanism.

In Fig. 21 I have shown a slightly modified form of hammer-actuating mechanism wherein the shaft 22ª that carries the hammer 6ª is provided with an arm 90ª that has one end of a long pawl 100 connected thereto. Said pawl 100 coöperates with a ratchet wheel 101 which receives its movement from the carriage-actuating spring drum 102, the movement of said ratchet wheel operating through the pawl 100 to move the hammer 6ª away from the plungers in the type-carrying member. The pawl 100 also holds the hammer in inoperative position, as shown in Fig. 21, and a link 103 is connected to said pawl and to the escapement pawl 82ª so as to move the end of the pawl 100 out of engagement with the teeth of the ratchet wheel 101 whenever the escapement pawl is depressed, said pawl 100 being returned into engagement with the teeth of the ratchet wheel 101 by means of a spring 104. The disengagement of the pawl 100 from its coöperating ratchet 101 will release the hammer 6ª and said hammer will then be moved into contact with the plunger which is in alinement with same by means of a coiled spring 105 connected to an arm on the shaft 22ª to which the hammer is connected. In view of the fact that the carriage of the machine has to be moved laterally to the right to return it to starting position, it is necessary to provide some means for preventing the ratchet 101 from moving when the carriage is being returned. To this end I have connected the ratchet wheel 101 and spring drum 102 together in such a manner that said ratchet wheel will be disconnected from the spring drum when the carriage is being moved back to starting position. The spring drum is provided with a ratchet wheel 106, and a gear 107 that is loosely mounted on the shaft of the spring drum is provided with a spring-actuated pawl 108 that coöperates with the ratchet 106, said pawl 108 being so arranged that it causes the gear 107 to move with the spring drum 102 when it rotates in the direction of the arrow in Fig. 21 but permits said gear 107 to remain at rest when the spring drum rotates in the opposite direction; namely, when the carriage is being moved to the right back to normal position.

The gear 107 coöperates with a pinion 109 on the ratchet wheel 101 that coöperates with the pawl 100, thereby causing said ratchet wheel to rotate step by step with the spring drum.

Having thus described my invention, what I claim as new and desire to secure by Letters Patent is:

1. A typewriting machine comprising a type-carrying member, a hammer for causing impressions of the type to be made on the paper arranged on the platen of the machine, key levers, mechanism for moving the type-carrying member horizontally and vertically to position the type thereon comprising members that extend transversely underneath the key levers, and movable devices coöperating with each key lever and adapted to be actuated by same for operating the members that extend underneath the key levers; substantially as described.

2. A typewriting machine comprising a type-carrying member, a hammer for causing impressions of the type to be made on the paper arranged on the platen of the machine, key levers, mechanism for moving the type-carrying member horizontally and vertically to position the type thereon comprising bars that extend transversely underneath the key levers, and pivotally mounted arms for operating said bars and each being provided with an irregular-shaped slot that receives a projection on one of the key levers; substantially as described.

3. A typewriting machine comprising a type-carrying member, key levers, mechanism for positioning the type-carrying member comprising a pair of bars that extend transversely of said key levers, and a pair of pivotally mounted members coöperating with each key lever for operating said bars, said members being provided with different shaped inclined or cam faces that are engaged by projections on the key levers; substantially as described.

4. A typewriting machine comprising a type-carrying member, pivotally mounted key levers, bars extending transversely underneath the key levers for moving said type-carrying member vertically and laterally, pivotally mounted arms adapted to engage and move said bars, and means on the key levers for actuating said arms; substantially as described.

5. A typewriting machine comprising a type-carrying member, a type-actuating hammer, key levers, mechanism for positioning the type-carrying member comprising a pair of bars that extend transversely of the key levers, means operated by the key levers for actuating said hammer, and a pair of pivotally mounted arms coöperating with each key lever and adapted to operate the bars of said positioning mechanism, said arms being connected to the key levers in such a way that they will come to rest before the key levers have reached the limit of their downward movement; substantially as described.

6. A typewriting machine comprising a type-carrying member, key levers, mechanism for moving the type-carrying member vertically and laterally, a pair of pivotally mounted arms coöperating with each key lever for actuating said mechanism, and projections on the key levers which extend into irregular-shaped slots in said arms; substantially as described.

7. A typewriting machine comprising a type-carrying member, key levers, mechanism for positioning the type-carrying members comprising bars that extend transversely underneath the key levers, pivotally mounted members operated by the key levers for imparting movement to said bars, and movable stops adapted to engage the underneath sides of said bars to limit their downward movement; substantially as described.

8. A typewriting machine comprising a type-carrying member, key levers, mechanism for positioning said type-carrying member comprising bars that extend transversely underneath the key levers, pivotally mounted arms for imparting movement to said bars, means for causing the key levers to move said arms for varying distances, and stops provided with lugs of different length for limiting the downward movement of said bars; substantially as described.

9. A typewriting machine comprising a type-carrying member, key levers, bars arranged transversely underneath said key levers for actuating mechanism that moves the type-carrying member vertically and transversely, means operated by the key levers for moving said bars for varying distances, pivotally mounted stops adapted to engage said bars and limit their downward movement, and means on the key levers for moving said stops out of alinement with said bars; substantially as described.

10. A typewriting machine comprising a type-carrying member, a type-actuating hammer, a rock shaft to which said hammer is connected, key levers, a bar arranged transversely of the levers and adapted to be actuated thereby, a rock arm connected to said bar, and a link connected to the shaft to which the hammer is secured and provided with an elongated slot that receives a projection on said rock arm; substantially as described.

11. A typewriting machine comprising a type-carrying member, a vertically disposed bar to which said type-carrying member is connected, a transversely movable support for said bar, a type-actuating hammer, and means for moving said bar vertically and said support horizontally to position the type-carrying member; substantially as described.

12. A typewriting machine comprising a type-carrying member, a vertically disposed bar to which said type-carrying member is connected, a guide in which said bar is reciprocatingly mounted, a type-actuating hammer, means for moving said bar vertically in its guide, and independent means for moving said guide transversely; substantially as described.

13. A typewriting machine comprising a type-carrying member, a vertically disposed bar to which said member is connected, a guide in which said bar is mounted, a type-actuating hammer, key levers, mechanism actuated by the key levers for moving said guide transversely for varying distances and for moving said bar vertically in said guide for varying distances to position the type-carrying member relatively to the hammer, and independent means for bodily shifting the guide that receives the bar to which the type-carrying member is connected; substantially as described.

14. A typewriting machine comprising a type-carrying member, a vertically disposed bar to which said member is connected, a horizontally movable guide in which said bar is mounted, a shaft forming a support for said guide, a collar loosely mounted on said shaft and connected to said guide, a second collar surrounding the shaft and engaging the guide, a coiled expansion spring interposed between said collars, and manually-operated means for moving the second collar referred to to shift the guide and type-carrying member; substantially as described.

15. A typewriting machine comprising a type-carrying member, a guide in which said member is reciprocatingly mounted, a horizontally disposed shaft that forms a support for said guide, a lug on said guide, an actuating bar adapted to engage said lug to move the guide laterally, and means for operating said bar; substantially as described.

In testimony whereof I hereunto affix my signature in the presence of two witnesses, this seventeenth day of December, 1907.

WILLIAM W. HOPKINS.

Witnesses:
WELLS L. CHURCH,
GEORGE BAKEWELL.